United States Patent [19]

Wilson et al.

[11] Patent Number: 4,646,414

[45] Date of Patent: Mar. 3, 1987

[54] DEVICE FOR GRIPPING AND DETACHING A TOP NOZZLE SUBASSEMBLY FROM A RECONSTITUTABLE FUEL ASSEMBLY

[75] Inventors: John F. Wilson, Murrysville Boro; Robert K. Gjertsen, Monroeville Boro, both of Pa.

[73] Assignee: Westinghouse Electric Corp., Pittsburgh, Pa.

[21] Appl. No.: 715,850

[22] Filed: Mar. 25, 1985

[51] Int. Cl.⁴ .......................... B23P 19/02; B23P 19/00
[52] U.S. Cl. ..................................... 29/426.4; 29/723; 414/786
[58] Field of Search ............... 29/426.4, 400 N, 723, 29/426.5, 426.1; 376/261, 262, 463; 414/786

[56] References Cited

U.S. PATENT DOCUMENTS

| | | | |
|---|---|---|---|
| 3,514,838 | 6/1970 | Freeborg | 29/426.4 |
| 3,768,668 | 10/1973 | Schukei | 376/262 |
| 3,887,980 | 6/1975 | Yates et al. | 29/200 |
| 4,078,967 | 4/1978 | Anthony . | |
| 4,219,386 | 8/1980 | Osborne et al. | 176/78 |
| 4,321,111 | 4/1982 | Jabsen . | |
| 4,355,449 | 10/1982 | Edwards et al. | 29/400 N |
| 4,358,421 | 11/1982 | Jabsen | 376/271 |
| 4,376,092 | 4/1983 | Kmonk et al. . | |

FOREIGN PATENT DOCUMENTS

1018662  1/1966  United Kingdom .
2031217  4/1980  United Kingdom .

*Primary Examiner*—Howard N. Goldberg
*Assistant Examiner*—Irene Graves Golabi

[57] ABSTRACT

A device for gripping and detaching a top nozzle subassembly from the upper end portions of the guide thimbles in a reconstitutable fuel assembly includes a central spider assembly disposable in overlying relation to an upper hold-down plate of the top nozzle subassembly, locating lugs arranged for insertion into coolant flow openings in the hold-down plate, collars interconnected to the spider and being disposed on the locating lugs and bearing on the hold-down plate when the locating lugs are inserted in the flow openings, and elongated studs received through and rotatable within respective central bores defined in the locating lugs. Upon rotation of the studs in one direction, compression of the hold-down springs disposed between the plates relieves the tension on the guide thimble upper end portions whereby the upper end portions are thereby prepared to be severed at locations immediately below the upper limit. After severing, rotation of the studs in the opposite direction allows the hold-down plate to be released from the unsevered guide thimble upper end portions at the upper limit. In case the hold-down plate does not release, positive release is obtained through the use of an impact-transmitting rod which is mounted in the central spider and attachable at its lower end to the hold-down plate.

14 Claims, 6 Drawing Figures

DEVICE FOR GRIPPING AND DETACHING A TOP NOZZLE SUBASSEMBLY FROM A RECONSTITUTABLE FUEL ASSEMBLY

CROSS REFERENCE TO RELATED APPLICATIONS

Reference is hereby made to the following copending applications dealing with related subject matter and assigned to the assignee of the present invention:

1. "Nuclear Reactor Fuel Assembly With Improved Top Nozzle and Hold-Down Means" by Robert K. Gjertsen et al, assigned U.S. Ser. No. 542,625 and filed Oct. 17, 1983.
2. "Nuclear Reactor Fuel Assembly With Fuel Rod Removal Means" by Robert K. Gjertsen et al, assigned U.S. Ser. No. 545,419 and filed Oct. 25, 1983.
3. "Reconstituting A Nuclear Reactor Fuel Assembly" by John M. Shallenberger et al, assigned U.S. Ser. No. 564,056 and filed Dec. 21, 1983.

BACKGROUND OF THE INVENTION

1. Field of the Invention

The present invention relates generally to fuel assemblies for nuclear reactors and, more particularly, is concerned with a device and method for gripping and detaching a top nozzle as an assembled unit from a reconstitutable fuel assembly.

2. Description of the Prior Art

In most nuclear reactors, the reactor core is comprised of a large number of elongated fuel assemblies which receive support and alignment from upper and lower transversely extending core support plates. Conventional designs of these fuel assemblies include a plurality of fuel rods and control rod guide thimbles held in an organized array by a plurality of grids spaced along the fuel assembly length and attached to the control rod guide thimbles. Top and bottom nozzles on opposite ends of the fuel assembly are secured to the guide thimbles to thereby form an integral fuel assembly. The guide thimbles extend slightly above and below the ends of the fuel rods. Additionally, fuel assemblies have also employed a hold-down device to prevent the force of upward coolant flow from lifting the fuel assembly into damaging contact with the upper core support plate, while allowing for changes in fuel assembly length due to core induced thermal expansion and the like. One such hold-down device is illustrated and described in the first application cross-referenced above.

During operation of such fuel assembly in a nuclear reactor, a few of the fuel rods may occasionally develop cracks along their lengths resulting primarily from internal stresses, thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored. Since the fuel rods are part of the integral assembly of the guide thimbles attached to the top and bottom nozzles, it is difficult to detect and remove the failed rods.

In view of the high costs associated with replacing fuel assemblies, considerable interest has arisen in reconstitutable fuel assemblies in order to minimize operating and maintenance expenses. The general approach to making a fuel assembly reconstitutable is to provide it with a removable top nozzle. One fuel assembly construction adapted to be reconstitutable is the fuel assembly with the hold-down device as disclosed in the first application cross-reference above. The method of reconstituting this fuel assembly is illustrated and described in the third application cross-referenced above.

The top nozzle subassembly of the fuel assembly disclosed in the first cross-referenced application, which includes the hold-down device as an integral part thereof, is basically made up of a coil spring disposed about the upper end of each guide thimble and sandwiched between a lower adapter plate and an upper hold-down plate. The lower adapter plate is slidably mounted on the guide thimble and its downward movement is limited by a lower retainer attached on the guide thimble. The upper hold-down plate has a passageway matched with each guide thimble with an internal ledge defined in the lower portion of the passageway. The guide thimble is received in the passageway so as to mount the hold-down plate on the thimble for slidable movement therealong. An upper retainer is attached on the upper end of the guide thimble and disposed within the passageway of the hold-down plate. The upper retainer cooperates with the internal ledge of the passageway to limit the upward movement of the hold-down plate along the guide thimble. The construction is such that the upper end of the guide thimble, along with the upper retainer, are permitted to reciprocate within the passageway of the hold-down plate, thus allowing for thermal growth of the guide thimble. The coil springs are held in a state of compression between the lower adapter plate and the upper hold-down plate.

The method for reconstituting the top nozzle subassembly without its hold-down device coming apart, as disclosed in the third cross-referenced application, includes the following operative steps. First, a force is applied to the upper hold-down plate to move it downwardly which compresses the springs. Second, with the force being maintained on the hold-down plate, an in-tube cutter is used to sever the upper end of each guide thimble at an axial location below where the thimble is bulge fitted or connected to the upper retainer. Third, after severing is completed, a pair of container fingers are applied to the top nozzle so as to extend above the upper surface of the hold-down plate and below the lower surface of the adapter plate. Then, the force is slowly removed allowing the springs to expand and push the hold-down plate upwardly into abutting contact with the upper ends of the fingers. Finally, with the container fingers in place, the top nozzle subassembly is lifted, generally vertically, upwardly and off the severed guide thimbles as a unit. The severed upper ends of the thimbles and the upper retainers are carried away in the passageways of the hold-down plate of the removed top nozzle subassembly. By reversing the above steps, the top nozzle subassembly can be remounted as a unit back on the guide thimbles, except that now instead of the severing step, new upper retainers similar to the old ones are inserted into the passageways and attached to the upper ends of the guide thimbles.

Notwithstanding the generally acceptable performance of the above-described top nozzle subassembly and method of removing the same as a unit during reconstitution of the fuel assembly, certain problems point to the need for an improved device for removing the top nozzle. First, the prior method of removing the top nozzle fails to provide a mechanism to overcome the slight interference fit formed between the outside surfaces of the guide thimble upper ends and the inside surfaces of the upper retainers due to the bulging operation for attaching the retainers to the guide thimbles. In other words, some means is necessary to apply a force on the retainers to pull them free of the portions of the guide thimbles immediately below the location at which the thimble upper ends were severed. Second, the prior method fails to provide a single device capable of imposing the required force on the hold-down plate, holding the force so as to keep all of the hold down springs in a compressed state, and then gradually releasing the force. Third, the prior method does not provide a single device useful to both grip the top nozzle subassembly and remove it from the fuel assembly. In summary, a need exists for a single device which would provide all of the above-described functions in removing the top nozzle subassembly from the reconstitutable fuel assembly.

SUMMARY OF THE INVENTION

The present invention provides a device capable of gripping and detaching the top nozzle subassembly from the reconstitutable fuel assembly in a manner designed to satisfy the aforementioned needs. The device overcomes all of the shortcomings cited in connection with the prior method. First, the device is capable of pressing the hold-down plate downwardly and holding a level of force necessary to depress all of the hold-down springs until all of the guide thimbles are severed. Then, the device can be adjusted to allow the springs to gradually expand to their free length in a controlled manner. Second, the device incorporates a mechanism which ensures that all of the upper retainers can be easily removed from the guide thimbles after severance and substantially at the same instance. Third, the device is adapted to grip the top nozzle subassembly and remove it from the fuel assembly as a unit. Finally, the device is relatively easy to manipulate remotely and takes advantages of pre-existing features in the top nozzle hold-down plate and adapter plate to achieve its capabilities.

Accordingly, the present invention sets forth for use with a reconstitutable fuel asssembly including a top nozzle subsassembly and a plurality of guide thimbles, wherein the top nozzle subassembly has a lower adapter plate, a plurality of hold-down springs and an upper hold-down plate with a plurality of coolant flow holes defined therethrough and wherein the guide thimbles have upper end portions slidably mounting the lower adapter plate and upper hold-down plate for movement therealong between lower and upper limits, a device and method for gripping and detaching the top nozzle subassembly from the guide thimble upper end portions.

The device for gripping and detaching the top nozzle subassembly from the guide thimble upper end portions includes: (A) a central spider disposable in overlying relation to the upper hold-down plate; (b) a plurality of locating lugs disposed radially outwardly from the spider and arranged for alignment with and insertion into the plurality of coolant flow openings in the upper hold-down plate, each of the locating lugs having an elongated central bore; (c) a plurality of collars interconnected to the spider, each collar connected to one of the locating lugs and bearing on the hold-down plate when the locating lug is inserted in its respective flow opening; and (d) a plurality of elongated members received through and rotatable within the respective central bores of the locating lugs, each member being couplible with the lower adapter plate such that upon rotation in one direction the lower adapter plate and upper hold-down plate are moved toward one another which increases the compression of the hold-down springs and concurrently relieves the tension of the guide thimble upper end portions at the upper limit thereof in preparation for severing of the guide thimble upper end portions at locations immediately below the upper limit, whereas upon rotation in an opposite direction the compression of the hold-down springs is decreased which causes the lower adapter plate and upper hold-down plate to move away from one another and allows the hold-down plate to release from the unsevered guide thimble upper end portions at the upper limit.

More particularly, the central spider includes an elongated central hub having upper and lower ends, a plurality of spokes having inner and outer ends with each spoke being connected at its inner end to the lower end of the central hub, extending radially outwardly therefrom and connected at its outer end to one of the collars, and a handle connected to the upper end of the central hub.

Further, the gripping and detaching device includes an impact-transmitting rod mounted in the central spider hub for movement toward and away from the upper hold-down plate with the rod being attachable at its lower end to the hold-down plate, and means carried on the rod being actuatable to deliver an upwardly directed driving force on the upper hold-down plate via the rod in order to cause positive release of the hold-down plate from the unsevered guide thimble upper end portions. More specifically, the actuatable means includes an impact generating slug having a central bore through which the impact-transmitting rod extends for mounting the slug for slidable movement along the rod, and an impact-receiving anvil fixed on the impact transmitting rod across the path of slidable movement of the slug along the rod.

The method for gripping and detaching the top nozzle subassembly from the guide thimble upper end portions includes the operative steps of: (a) inserting a plurality of interconnected locating lugs into a plurality of coolant flow openings in the upper hold-down plate until upper collars on the lugs overlie and bear on the hold-down plate; (b) rotating a plurality of elongated studs, being received through respective central bores of the locating lugs and coupled with the lower adapter plate, in one predetermined direction for causing movement of the lower adapter plate and upper hold-down plate toward one another which increases the compression of the hold-down springs and concurrently relieves the tension on the guide thimble upper end portions at the upper limit thereof in preparation for severing of the guide thimble upper end portions at locations immediately below the upper limit; and (c) after severing of the guide thimble upper end portions, rotating the studs in an opposite predetermined direction for decreasing the compression of the hold-down springs which causes the movement of the lower adapter plate and upper hold-down plate away from one another and allows the release of the hold-down plate from the unsevered guide thimble upper end portions at the upper limit. Further, the gripping and detaching method, in case that the upper hold-down plate fails to release from the unsevered guide thimble upper end portions, includes the operative step of delivering an upwardly directed driving force on the upper hold-down plate in order to cause positive release of the hold-down plate from the unsevered guide thimble upper end portions.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

In the following description, like reference characters designate like or corresponding parts throughout the several views. Also, in the following description, it is to be understood that such terms as "forward", "rearward", "left", "right", "upwardly", "downwardly", and the like, are words of convenience and are not to be construed as limiting terms.

IN GENERAL

Figure 1:
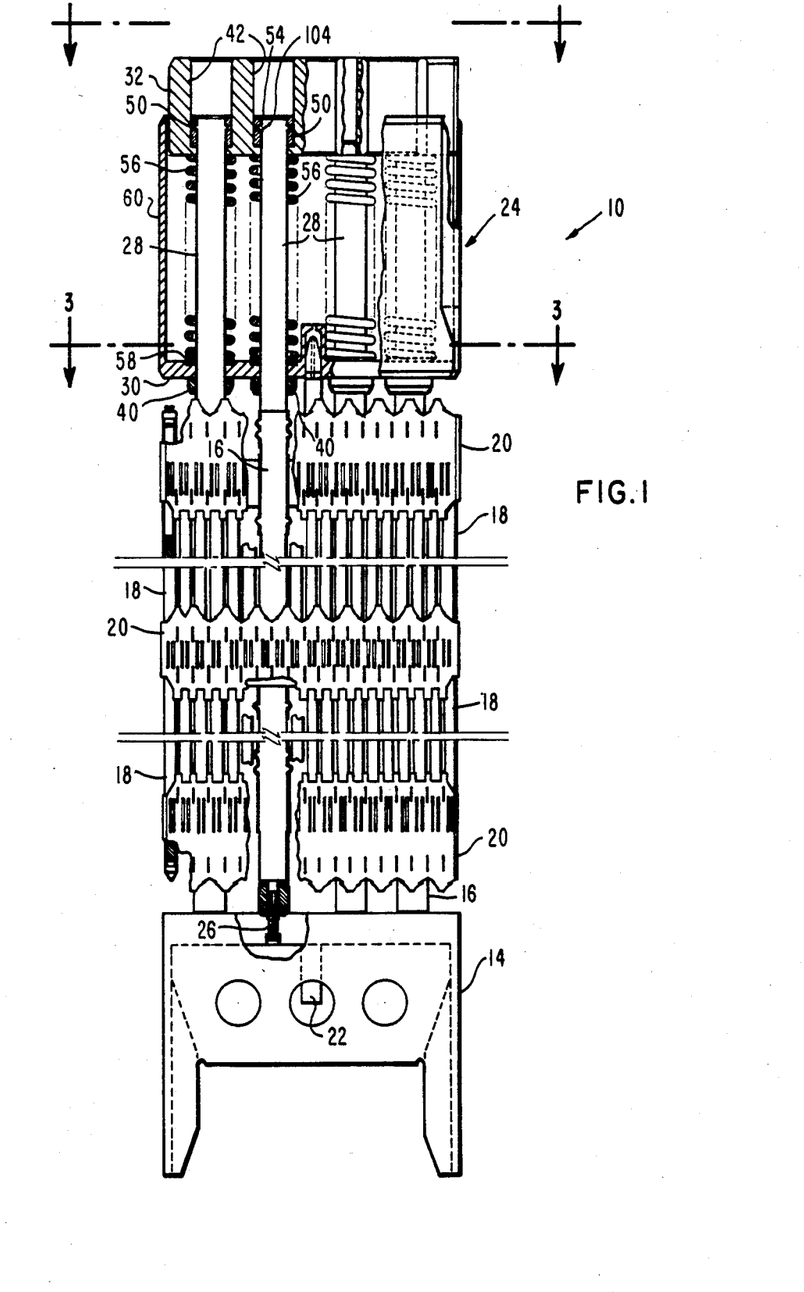
FIG. 1 is a partially sectioned elevational view, with parts being broken away for clarity, of a reconstitutable fuel assemmbly having a top nozzle subassembly construction of the type to which the gripping and detaching device of the present invention can be applied.
Figure 4:
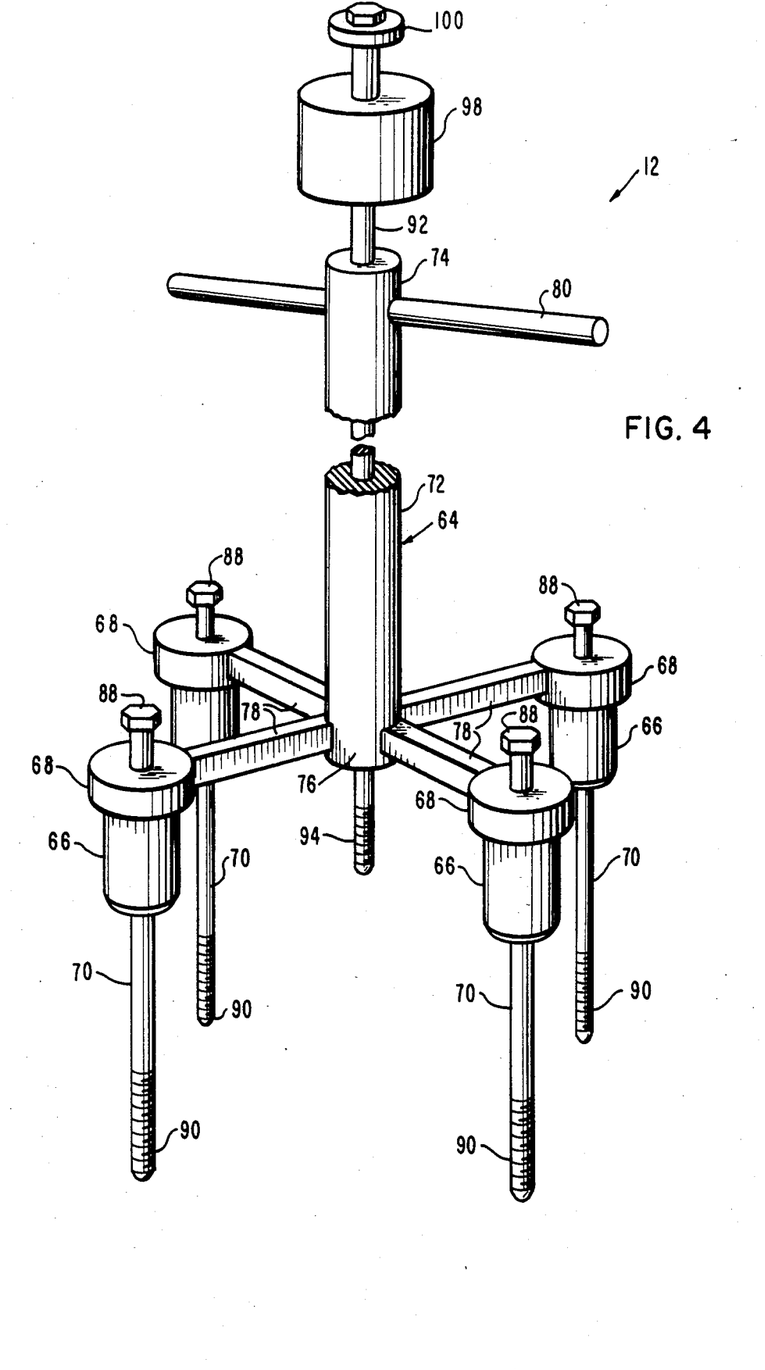
FIG. 4 is a fragmentary perspective view of the gripping and detaching device of the present invention.
Figure 5:
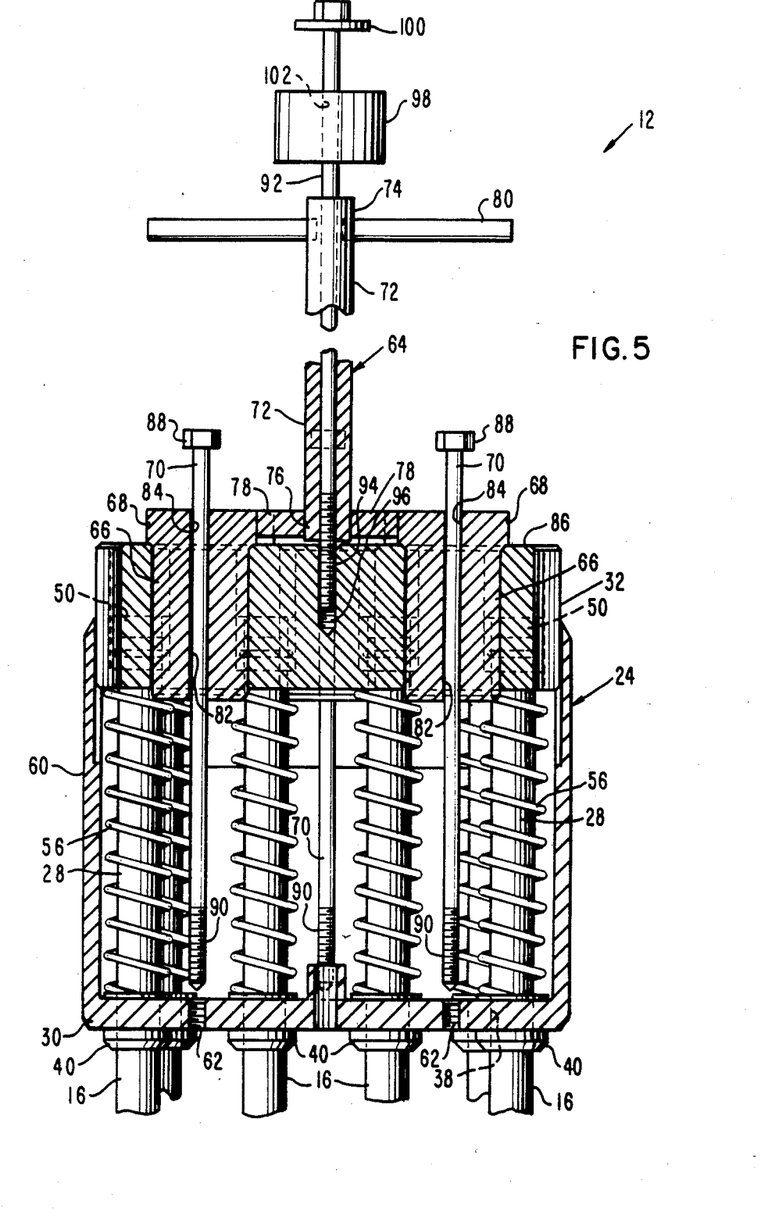
FIG. 5 is a sectioned view, on a smaller scale, of the top nozzle as taken along line 5—5 of FIG. 2 and of the device inserted thereon prior to being moved to its operative position in which it is gripped to the top nozzle subassembly and can then be actuated to detach the upper retainers from their interference fit with the guide thimbles.
Figure 6:
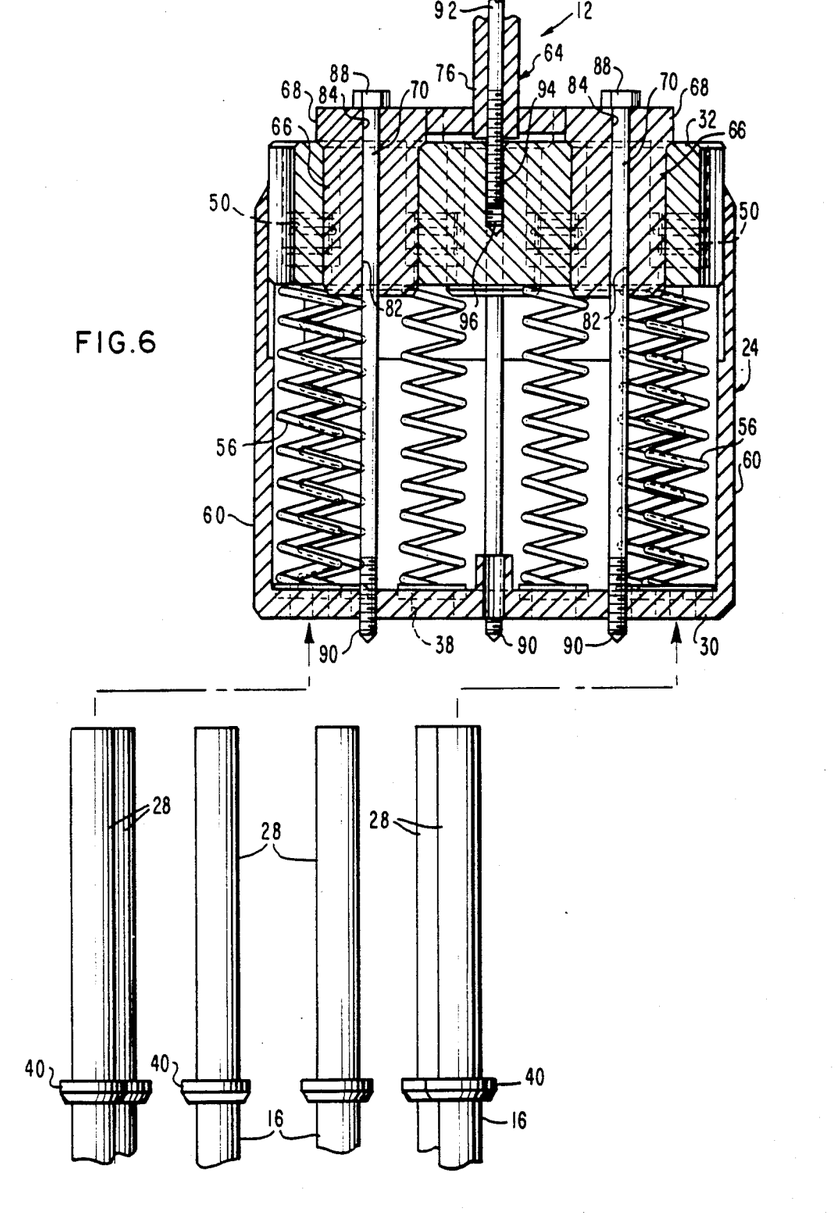
FIG. 6 is a sectioned view of the top nozzle and of the device inserted thereon similar to that of FIG. 5, but with the device in its operative position and after lifting of the top nozzle subassembly from the guide thimbles.

Referring now to the drawings, and particularly to FIG. 1, there is shown a reconstitutable fuel assembly, being generally designated by the numeral 10, on which a top nozzle subassembly gripping and detaching device, generally indicated as 12 in FIGS. 4 through 6, can be employed.

Basically, the fuel assembly 10 includes a lower end structure or bottom nozzle 14 for supporting the assembly on the lower core plate (not shown) in the core region of a reactor (not shown) and a number of longitudinally extending control rod guide tubes or thimbles 16 projecting upwardly from the bottom nozzle 14. Further, an organized array of fuel rods 18 are held in spaced relationship to one another by a number of transverse grids 20 spaced along the fuel assembly length and attached to the guide thimbles 16. An instrumentation tube 22 is located at the center of the fuel assembly 10, while attached to the upper ends of the guide thimbles 16 is an end structure or top nozzle 24. The guide thimbles 16 and bottom and top nozzles 14,24 together form an integral assembly capable of being conventionally handled without damaging the assembly parts.

To form the fuel asembly 10, the transverse grids 20 are attached to the longitudinally guide thimbles 16 at predetermined axially locations and the fuel rods 18 are inserted from below through the grids 20. The lower nozzle 14 is then suitably attached, such as by machine screws 26, to the lower ends of the guide thimbles. Finally, the top nozzle 24 is attached to the upper end portions 28 of the guide thimbles 16. to control the fission process, a number of control rods (not shown) are reciprocally movable in the control rod guide thimbles 16 of the fuel assembly 10.

While the top nozzle 24 is in the form of a subassembly illustrated and described in detail in the first application cross-referenced above, it will be described herein to the extent necessary to facilitate a complete and thorough understanding of the top nozzle gripping and detaching device 12 of the present invention.

TOP NOZZLE SUBASSEMBLY WITH HOLD-DOWN MEANS

Figure 2:
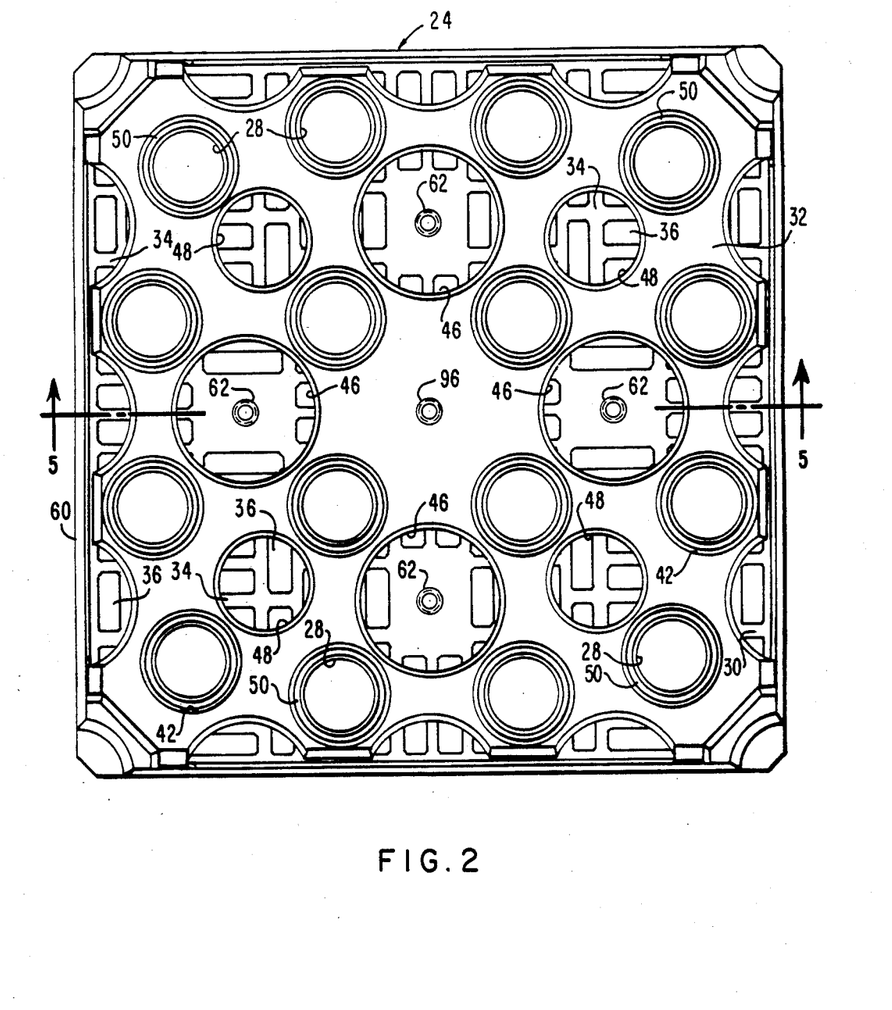
FIG. 2 is an enlarged top plan view of the fuel assembly as seen along line 2—2 of FIG. 1.
Figure 3:
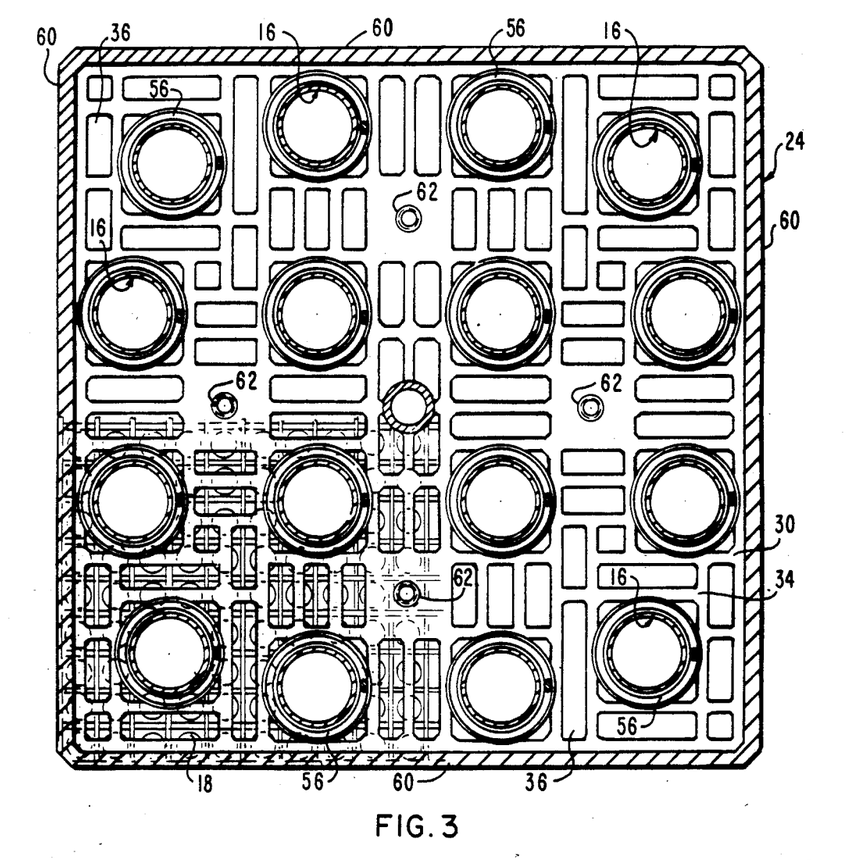
FIG. 3 is an enlarged sectional view of the fuel assembly as taken along line 3—3 of FIG. 1.

Referring now to FIGS. 1 through 3, the top nozzle subassembly 24 basically includes a lower adapter plate 30 and an upper hold-down plate 32. The lower adapter plate 30, as seen in FIG. 3, is formed of a plurality of cross-laced ligaments or bars 34 defining coolant flow openings 36 and is provided with a number of through holes 38 corresponding in number to the number of guide thimble upper end portions 28. The bars 34 overlie the upper ends of the fuel rods 18 such that the fuel rods are axially restrained or captured between the bottom and top nozzles 14,24. The holes 38 are of sufficient dimensional size and are in a pattern matched with the arrangement of the guide thimbles 16 such that the adapter plate 30 can be slidably mounted on the guide thimble upper end portions 28. Downward movement of the adapter plate 30 is limited by a plurality of lower ring-shaped retainers 40 mounted to the respective guide thimbles 16 at a location axially spaced above the upper ends of the fuel rods 18.

The upper hold-down plate 32 is also slidably mounted on the guide thimble upper end portions 28, via a plurality of respective passageways 42, with each of the passageways having an internal ledge 44 defined therein in a lower portion of the passageway. Each passageway 44 has a generally constant larger diameter upper segment and a generally constant diameter lower segment, with the latter defining the internal ledge 44 and being slidably engageable with the guide thimble upper end portions 28. As seen in FIG. 2, the hold-down plate 32 is also provided with a number of relatively large coolant flow openings 46 and several smaller coolant flow openings 48 positioned at predetermined locations about the plate 32. Axially spaced above the lower retainer 40 is another, upper retainer 50 mounted on each guide thimble upper end portion 28 and disposed within the upper segment of the respective passageway 42. The upper retainer 50 is in the form of a collar having an internal annular groove 52 in the upper portion thereof and is attached to an upper end 54 of the guide thimble 16 by circumferentially bulging the wall of the guide thimble upper end portion 28 into the internal groove 52 of the upper retainer 50. The attached upper retainers 50 cooperate with the internal ledges 44 to limit the upward movement of the hold-down plate 32 along the guide thimble upper end portion 28.

The top nozzle subassembly 24 further includes a coil spring 56 disposed on each of the guide thimble upper end portions 28 and interposed between the lower surface of the upper hold-down plate 32 and the upper surface of the lower adapter plate 30. Preferably, the coil springs 56 are held in compression between the upper hold-down plate 32 and the lower adapter plate 30 to preload the fuel assembly 10. For proper alignment of the coil springs 56 and to prevent them from contacting their respective guide thimbles 16, a spring seat 58 is provided on the lower end of each of the coil springs 56, setting in a recess formed in the upper surface of the lower adapter plate 30. In defining an enclosure for channeling the coolant flow upwardly at the upper region of the fuel assembly 10, upstanding sidewalls 60 are formed on the perpheral edges of the lower adapter plate 30. The upper hold-down plate 32 is slidable along the guide thimble upper end portions 28 within the enclosure sidewalls 60.

TOP NOZZLE GRIPPING AND DETACHING DEVICE

Now turning to FIGS. 4 through 6, there is shown the device, generally designated 12, for gripping and detaching the top nozzle 24 as a subassembly from the guide thimble upper end portions 28 of the reconstitutable fuel assembly 10. The device 12 utilizes a plurality of internally-threaded anchors 62 (FIGS. 2 and 3) defined in the lower adapter plate 30 between the coolant flow openings 36 and guide thimble holes 38, and a plurality of large coolant flow openings 46 defined in the upper hold-down plate 32 between its passageways 42 and vertically aligned with the anchors 62.

The gripping and attaching device 12 basically includes a central spider 64, a plurality of locking lugs 66 disposed radially outwardly from the spider 64, a plurality of collars 68 attached on the locating lugs 66 and interconnected to the central spider 64, and a plurality of elongated spring compression studs 70 associated with the locating lugs 66. The central spider 64, which during use (as seen in FIGS. 5 and 6) is disposed in overylying relation the upper hold-down plate 32, includes an elongated central hub 72 having upper and lower ends 74,76 (FIG. 4), a plurality of spokes 78 being connected at their inner ends to the lower end 76 of the central hub 72, extending radially outwardly therefrom, and being connected at their outer ends to the collars 68, and a handle 80 connected to the upper end 74 of the central hub 72 for use in handling the device 12.

The locating lug 66 are arranged and sized for alignment with and insertion into the large coolant flow openings 46 in the upper hold-down plate 32. Also, each of the locating lugs 66 and its upper collar 68 have elongated central bores 82,84 aligned with one another and with one of the anchors 62 in the lower adapter plate 30 when the lug 66 is inserted into its respective flow opening 46. As clearly seen in FIGS. 5 and 6, each collar 68 overlying one of the locating lugs 66 has a diameter larger than its respective lug 66 and the flow opening 46 into which the lug is inserted so that the collar will overlie the flow opening and bear on the upper surface 86 of the hold-down plate 32 when its lug is inserted in its respective flow opening.

The elongated spring compression studs 70 of the gripping and detaching device 12 are received through and rotatable within the respective aligned central bores 82,84 of the locating lugs 66 and collars 68. Each stud 70 has a socket element 88 on the upper end thereof for grasping to rotate the stud. The socket element 88 overlies and bears against the respective collar 68 of the one locating lug 66 through which the stud 70 is mounted. Each stud 70 also has an externally-threaded segment 90 defined at its lower end which adapts the stud for threaded engagement with one of the internally-threaded anchors 62 in the lower adapter plate 30.

When the spider 64 is installed on the top nozzle 24 with its locating lugs 66 inserted into respective large coolant flow openings 46 in the upper hold-down plate 32, rotation of each of the studs 70 in one predetermined direction will thread its threaded end segment 90 into one anchor 62 and when the socket element 88 bears on the upper surface 86 of the hold-down plate 32 continued threading of the stud into the adapter plate will cause movement of the adapter plate and upper hold-down plate toward one another. Such movement of the plates 30,32 increases the compression of the hold-down springs 56 disposed therebetween and concurrently relieves the tension imposed on the upper retainers 50 via the ledges 44 within the hold-down plate passageways 42. With tension on the upper retainers 50 so relieved, severing of the guide thimble upper end portions at locations immediately below the upper retainers 50 can now take place, for example, via the method illustrated and described in the third application cross-referenced above.

Once severing of the guide thimbles 16 is completed, rotation of the studs 70 in the predetermined opposite direction results in unthreading of each stud from its anchor 62 and thereby decreases the compression of the hold-down springs 56 which then cause the lower adapter plate 30 and upper hold-down plate 32 to move away from one another. Upon such movement, the ledges 44 of the hold-down plate 32 will engage the severed upper retainers 50 and ordinarily cause them to release from the remaining unsevered guide thimble upper end portions 28.

However, if the interference fit between the upper retainers 50 and the upper tips of the guide thimbles just below the location of severing is tight enough, the upper retainers may not release and a more positive way is needed to secure their removal. To satisfy this need, the device 12 additionally includes an impact-transmitting rod 92 mounted in the central spider hub 72 for movement toward and away from the upper hold-down plate 32. The rod 92 is externally-threaded at its lower end 94 for securement in an internally-threaded blind hole 96 in the upper surface 86 of the hold-down plate. Means carried on the rod 92 in the form of an impact-generating slug 98 and an impact-receiving anvil 100 are actuatable together to deliver an upwardly directed driving force on the upper hold-down plate 32 via the rod 92 to ensure a positive release of the upper retainers 50 from the unsevered guide thimble upper end portions 28. Specifically, the impact-generating slug 98 has a central bore 102 through which the rod 92 extends for mounting the slug for slidable movement along the rod. The impact-receiving anvil 100 is fixed on the impact-transmitting rod 92 across the path of the slidable movement of the slug 98 along the rod 92. Thus, when the slug 98 is struck against the stationary anvil 100, the force of the impact is transmitted from the anvil to the hold-down plate 32 via the interconnecting rod 92.

To summarize its operation, the device 12 is first lowered down onto the top nozzle 24 to the position seen in FIG. 5 where the locating lugs 66 are inserted into the large coolant flow openings 46 in the upper hold-down plate 32. Then, the four spring compression studs 70 are threaded into the internally-threaded anchors 62 in the lower adapter plate 30 by using an extension socket wrench engaged with the socket elements 88 on the studs. The studs 70 are then tightened down enough to relieve the tension load on the guide thimble upper end portions 28 and the upper retainers 50 attached thereto. The guide thimbles 16 are then severed just below the bulges 104 which should free the top nozzle subassembly from the fuel assembly skelton. The spring compression studs 70 are loosened to allow the hold-down springs 56 to raise the hold-down plate 32 which should pull the upper retainers 50 un the unsevered upper end portions 28 of the guide thimbles 16. If the upper retainers 50 do not become free, the impact rod 92 is then threaded into the hole 96 in the upper hold-down plate 32 and the impact slug 98 is used like a hammer to impact the plate 32 in an upward direction via the rod 92 and anvil 100. This will then free the upper retainers from the guide thimble upper end portions 28 and permit the top nozzle subassembly 24 to be lifted off the fuel assembly skelton, as seen in FIG. 6, using the handle 80 or a crane attached to the handle.

It is thought that the invention and many of its attendant advantages will be understood from the foregoing description and it will be apparent various changes may be made in the form, construction and arrangement thereof without departing from the spirit and scope of the invention or sacrificing all of its material advantages, the form hereinbefore described being merely a preferred or exemplary embodiment thereof.

We claim:

1. For use with a reconstitutable fuel assembly including a top nozzle subassembly and a plurality of guide thimbles, said top nozzle subassembly having a lower adapter plate, a plurality of hold-down springs and an upper hold-down plate with a plurality of coolant flow openings defined therethrough, said guide thimbles having upper end portions slidably mounting said lower adapter plate and upper hold-down plate for movement therealong between lower and upper limits, a device for gripping and detaching said top nozzle subassembly from said guide thimble upper end portions, comprising:
  (a) a central spider disposable in overlying relation to said upper hold-down plate;
  (b) a plurality of locating lugs disposed radially outwardly from said spider and arranged for alignment with and insertion into said plurality of coolant flow openings in said upper hold-down plate, each of said locating lugs having an elongated central bore;
  (c) a plurality of collars interconnected to said spider, each collar connected to one of said locating lugs and bearing on said hold-down plate when said locating lug is inserted in its respective flow opening; and
  (d) a plurality of elongated members received through and rotatable within said respective central bores of said locating lugs, each member being couplible with said lower adapter plate such that upon rotation in one direction said lower adapter plate and upper hold-down plate are moved toward one another which increases the compression of said hold-down springs and concurrently relieves the tension on said guide thimble upper end portions at said upper limit thereof in preparation for severing of said guide thimble upper end portions at locations immediately below said upper limit, whereas upon rotation in an opposite direction the compression of said hold-down springs is decreased which causes said lower adapter plate and upper hold-down plate to move away from one another and allows said hold-down plate to release from said unsevered guide thimble upper end portions at said upper limit.

2. The gripping and detaching device as recited in claim 1, wherein said central spider includes:
  an elongated central hub having upper and lower ends;
  a plurality of spokes having inner and outer ends, each spoke being connected at its inner end to said lower end of said central hub, extending radially outwardly therefrom, and connected at its outer end to one of said collars; and
  a handle connected to said upper end of said central hub.

3. The gripping and detaching device as recited in claim 1, further comprising:
  (e) an impact-transmitting rod mounted in said central spider for movement toward and away from said upper hold-down plate, said rod being attachable at its lower end to said hold-down plate; and
  (f) means carried on said rod being actuatable to deliver an upwardly directed driving force on said upper hold-down plate via said rod in order to cause positive release of said hold-down plate from said unsevered guide thimble upper end portions.

4. The gripping and detaching device as recited in claim 3, wherein said actuatable means includes an impact-generating slug having a central bore through which said rod extends for mounting said slug for slidable movement along said rod.

5. The gripping and detaching device as recited in claim 4, wherein said actuatable means also includes an impact-receiving anvil fixed on said impact-transmitting rod across the path of slidable movement of said slug along said rod.

6. The gripping and detaching device as recited in claim 1, wherein:
  said each of said plurality of collars has a central bore aligned with said central bore of said locating lug; and
  said elongated member being received through said bore of said collar.

7. The gripping and detaching device as recited in claim 6, wherein each of said members has a socket element on the upper end thereof for grasping to rotate said member, said socket element overlying and bearing against said respective collar.

8. For use with a reconstitutable fuel assembly including a top nozzle subassembly and a plurality of guide thimbles, said top nozzle subassembly having a lower adapter plate with a plurality of holes and a plurality of anchors defined between said holes, and upper hold-down plate with a plurality of passageways aligned with said holes and a plurality of coolant flow openings defined between said passageways and aligned with said anchors, and hold-down springs disposed between said plates, said guide thimbles having upper end portions which extend through said holes and passageways and slidably receive said lower adapter plate and upper hold-down plate for movement therealong, said guide thimble upper end portions having lower retainers mounted thereon below said adapter plate for limiting downward movement thereof and upper retainers mounted thereon within said passageways of said hold-down plate for limiting upward movement thereof, a device for gripping and detaching said top nozzle subassembly from said guide thimble upper end portions, comprising:

(a) a central spider disposable in overlying relation to said upper hold-down plate, said central spider including
  (i) an elongated central hub having upper and lower ends,
  (ii) a plurality of spokes having inner and outer ends, each spoke being connected at its inner end to said lower end of said central hub and extending radially outwardly therefrom, and
  (iii) a handle connected to said upper end of said central hub;

(b) a plurality of locating lugs disposed radially outwardly from said spider hub and arranged for alignment with and insertion into said plurality of coolant flow openings in said upper hold-down plate, each of said locating lugs having an elongated central bore aligned with one of said anchors in said lower adapter plate when said lug is inserted into its respective flow opening;

(c) a plurality of collars connected to said outer ends of said spokes of said spider, each collar overlying and connected to one of said locating lugs and having a diameter larger than its respective flow opening so as to overlie said flow opening and bear on said hold-down plate when said locating lug is inserted in its respective flow opening, each collar also having a central bore aligned with said central bore of said one locating lug; and (d) a plurality of elongated studs received through and rotatable within said respective aligned central bores of said locating lugs and said collars, each stud adapted for threaded engagement with one of said anchors in said lower adapter plate for rotation in one direction for threading into said one anchor and thereby causing movement of said lower adapter plate and upper hold-down plate toward one another which increases the compression of said hold-down springs therebetween and concurrently relieves the tension of said upper retainers in preparation for severing of said guide thimble upper end portions at locations immediately below said upper retainers, and for rotation in an opposite direction for unthreading from said one anchor and thereby decreasing the compression of said hold-down springs which causes movement of said lower adapter plate and upper hold-down plate away from one another and allows the release of said upper retainers from said unsevered guide thimble upper end portions.

9. The gripping and detaching device as recited in claim 8, further comprising:

(e) an impact-transmitting rod mounted in said central spider hub for movement toward and away from said upper hold-down plate, said rod attachable at its lower end to said hold-down plate; and (f) means carried on said rod being actuatable to deliver an upwardly directed driving force on said upper hold-down plate via said rod in order to cause positive release of said upper retainers from said unsevered guide thimble upper end portions.

10. The gripping and detaching device as recited in claim 9, wherein said actuatable means includes an impact-generating slug having a central bore through which said rod extends for mounting said slug for slidable movement along said rod.

11. The gripping and detaching device as recited in claim 10, wherein said actuatable means also includes an impact-receiving anvil fixed on said impact-transmitting rod across the path of slidable movement of said slug along said rod.

12. The gripping and detaching device as recited in claim 8, wherein each of said studs has a socket element on the upper end thereof for grasping to rotate said stud, said socket element overlying and bearing against said respective collar.

13. For use with a reconstitutable fuel assembly including a top nozzle subassembly and a plurality of guide thimbles, said top nozzle subassembly having a lower adapter plate, a plurality of hold-down springs and an upper hold-down plate with a plurality of coolant flow openings defined therethrough, said guide thimbles having upper end portions slidably mounting said lower adapter plate and upper hold-down plate for movement therealong between lower and upper limits, a method for gripping and detaching said top nozzle subassembly from said guide thimble upper end portions, comprising the steps of:

(a) inserting a plurality of interconnected locating lugs into a plurality of coolant flow openings in said upper hold-down plate until upper collars on said lugs overlie and bear on said hold-down plate;

(b) rotating a plurality of elongated studs, being received through respective central bores of said locating lugs and coupled with said lower adapter plate, in one predetermined direction for causing movement of said lower adapter plate and upper hold-down plate toward one another which increases the compression of said hold-down springs and concurrently relieves the tension of said guide thimble upper end portions at said upper limit thereof in preparation for severing of said guide thimble upper end portions at locations immediately below said upper limit; and (c) after severing of said guide thimble upper end portions, rotating said studs in an opposite predetermined direction for decreasing the compression of said hold-down springs which causes the movement of said lower adapter plate and upper hold-down plate away from one another and allows the release of said hold-down plate from said unsevered guide thimble upper end portions at said upper limit.

14. The gripping and detaching method as recited in claim 13, further comprising the step of:

(d) in case that said upper hold-down plate fails to release from said unsevered guide thimble upper end portions, delivering an upwardly directed driving force on said upper hold-down plate in order to cause positive release of said hold-down plate from said unsevered guide thimble upper end portions.

* * * * *